United States Patent [19]
Kita

[11] 4,285,246
[45] Aug. 25, 1981

[54] INTAKE AIR FLOW RATE DETECTOR

[75] Inventor: Toru Kita, Yokohama, Japan

[73] Assignee: Nissan Motor Co., Ltd., Yokohama, Japan

[21] Appl. No.: 100,706

[22] Filed: Dec. 4, 1979

[30] Foreign Application Priority Data

Dec. 6, 1978 [JP] Japan .................................. 53/149929

[51] Int. Cl.³ .......................... G01F 1/32; G01F 1/86
[52] U.S. Cl. ................................................. 73/861.03
[58] Field of Search ........... 73/861.03, 861.02, 861.22, 73/861.23, 861.24

[56] References Cited

U.S. PATENT DOCUMENTS

| | | | |
|---|---|---|---|
| 3,785,204 | 1/1974 | Lisi | 73/861.03 |
| 4,050,304 | 9/1977 | Thomas | 73/861.03 |

Primary Examiner—Herbert Goldstein
Attorney, Agent, or Firm—Lowe, King, Price & Becker

[57] ABSTRACT

An intake air flow rate detector of an internal engine using a Karman vortex sensor, wherein the mass flow rate is obtained by detecting a volumetric flow rate by the Karman vortex sensor and a dynamic pressure or differential pressure at upstream and downstream of the sensor by a strain gage mounted on a partition in a closed chamber. Density compensation of the flow of air is effected only taking said measurement values at a standard range in which the Karman vortex is stable and the differential pressure has a large value.

3 Claims, 2 Drawing Figures

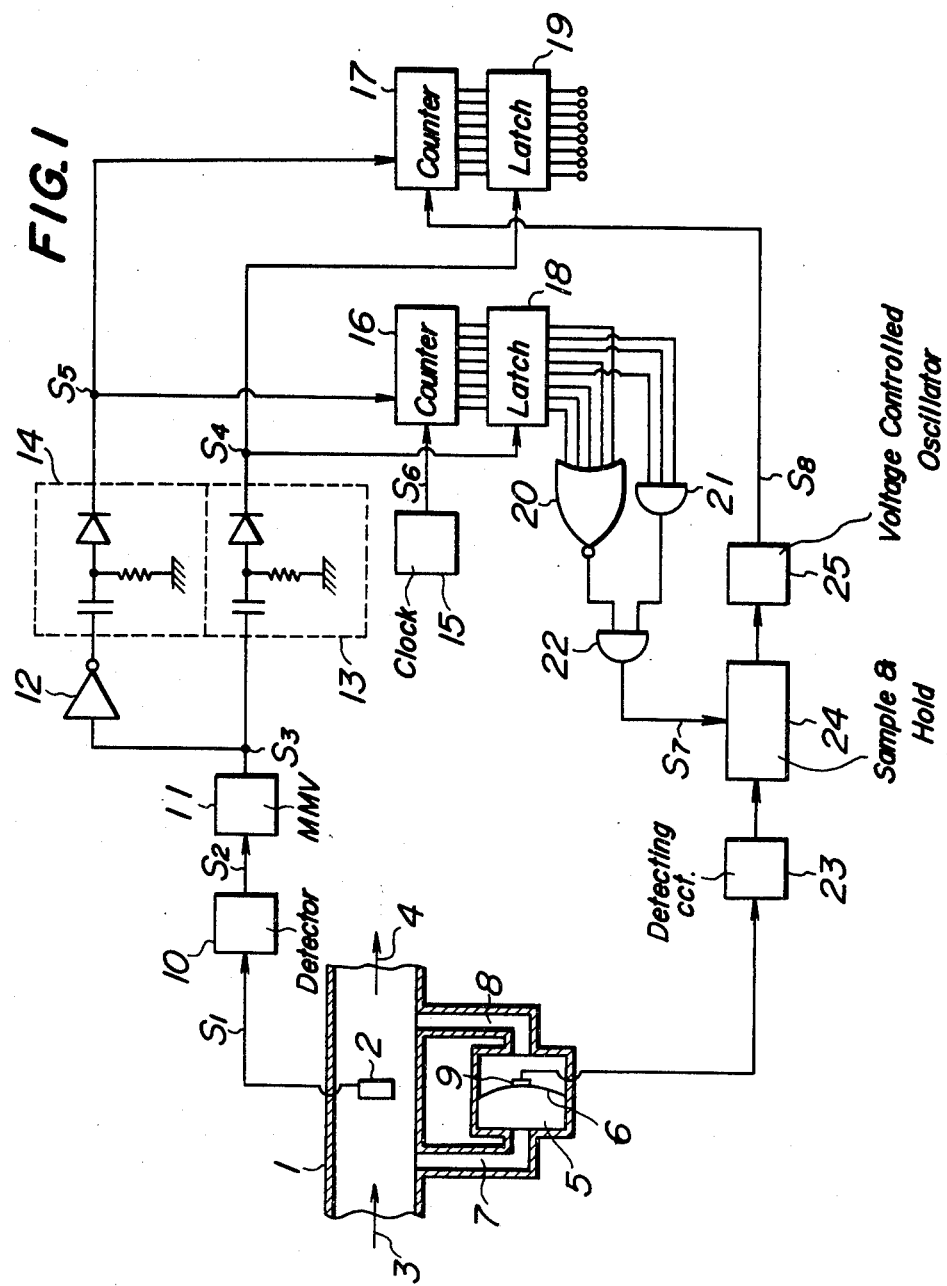

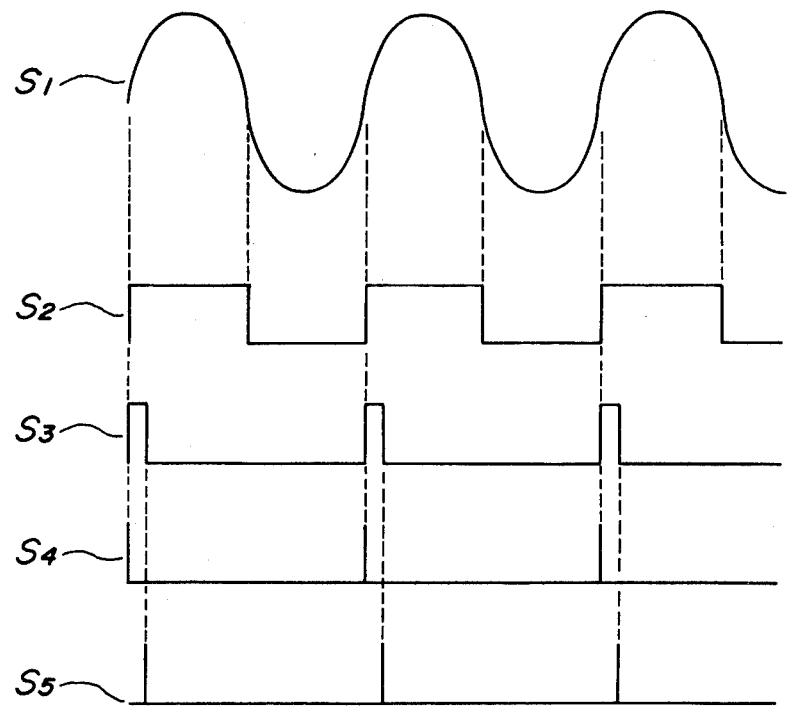

INTAKE AIR FLOW RATE DETECTOR

BACKGROUND OF THE INVENTION

(1) Field of the Invention

The present invention relates to an intake air flow rate detector of an internal engine and more particularly relates to an intake air mass flow rate detector using Karman vortex sensor.

(2) Description of the Prior Art

A Karman vortex sensor comprises a column shaped vortex generator arranged in a flow of a medium and is based on a principle that the frequency of the generated Karman vortex is in proportion to the flow velocity of the flowingmedium. The Karman vortex sensor is suitable for use as a detector of the amount of intake air due to its simplicity in construction and its small resistance for the flow of the intake air.

One drawback of the Karman vortex sensor is that it requires a compensation by mass of the flowing medium or the air. This is by a reason that the detected signal of a Karman vortex sensor is in proportion to the volumetric flow rate Qv, whereas the amount of the intake air of an internal engine should be detected by the mass flow rate Qw so a compensation or calibration is required.

As a conventional method for detecting the mass flow rate Qw it has been known to use a Karman vortex sensor in combination with a dynamic pressure detector for instance a Pitot tube. The volumetric flow rate Qv is detected by the Karman vortex sensor and the dynamic pressure $\rho Q^2 v$ (where $\rho$ is density of the air) is detected by the dynamic pressure detector. By using an operational circuit and by making dividing operation the mass flow rate Qw is obtained according to a formula:

$$Qw = \rho Qv = \frac{\rho Q^2 v}{Qv}$$

In an internal combustion egine for an automobile, the amount of the intake air varies greatly and the range of the variation is very wide so that there will be a comparative portion in said wide range in which an error by the above measurement becomes substantially large.

Namely the range of generation of the Karman vortex of the Karman vortex sensor depends on the velocity of the flow (Reynolds number). The range in which a stable Karman vortex train appears is about 3,000 to 45,000 in Reynolds number. Beyond this range, the instability of the Karman vortex tends to increase. Whereas the range of measurement of the intake air of an internal engine of an automotive vehicle is quite large as 1,200 to 65,000 by Reynolds number in case of an engine having a displacement of 2,000 cc and the width of the vortex number is 20 mm. Therefore at portions located at both extremities of the range of the measurement, the value obtained may become instable. Furthermore, since the dynamic pressure is in proportion to the square of the volumetric flow rate, the level becomes very small at the flow rate range and a large measurement error results. If the mass flow is calculated by dividing operation of the two values obtained at such circumstances, the error at high flow rate and low flow rate (especially the more for the latter) becomes large mainly due to error in the measurement of the dynamic pressure and unstable rotation of the engine may be caused.

SUMMARY OF THE INVENTION

The present invention is to solve the aforementioned problem. The invention has its object to realize an intake air flow rate detector being able to measure the mass flow rate stably and accurately over a wide range extending from a high flow rate range to a low flow rate range.

In order to realize the afornementioned object, the present invention is based on a principle to decide a standard flow rate range in which the generation of the Karman vortex is stable and the dynamic pressure is sufficiently large, and the dynamic pressure is measured only at a time when the Karman vortex sensor output shows above standard flow rate, and the compensation for the mass of the air if effected based on a value obtained in said measurement.

BRIEF DESCRIPTION OF THE DRAWINGS

The invention will now be explained by referring to the accompanied drawings, in which:

FIG. 1 is an explanatory view partially in block diagram for showing one embodiment of the present invention;

and

FIG. 2 is a diagram for showing the signal waveforms producing in FIG. 1.

DESCRIPTION OF THE PREFERRED EMBODIMENT

In FIG. 1, reference numeral 1 designates an intake tube of an engine. A Karman vortex sensor 2 is arranged in said intake tube 1. The intake air flows through in a direction shown by arrows 3 and 4.

There is provided a closed chamber 5 having a partition diaphragm 6 dividing the chamber 5 into two parts or sections. The chamber 5 is connected by two pipes 7 and 8 to the intake tube 1 through pressure introducing holes provided at an upstream and downstream of the Karman vortex sensor 2, respectively. The strain produced on the diaphragm 6 caused from a pressure difference by the presence of the Karman vortex sensor 2 is detected by a strain gage 9 mounted on the diaphragm 6.

The pressure difference $\Delta P$ produced between the upstream and the downstream of the Karman vortex sensor 2 has a value of $\Delta P = \rho Q^2 V$. A pressure difference detecting circuit 23 connected to the output of the strain gage 9 produces an output signal in proportion to said difference pressure $\Delta P$.

On the other hand the Karman vortex sensor 2 produces a signal $S_1$ in synchronism with the production of the Karman vortex. A detecting circuit 10 connected to the sensor 2 produces a pulse signal $S_2$ synchronized with said signal $S_1$.

A monostable multivibrator 11 connected to the detector 10 is triggered by said pulse signal $S_2$ and produces a narrow constant width signal $S_3$.

This signal $S_3$ is supplied directly to a differentiating circuit 13 and is supplied to a differentiating circuit 14 through an inverter 12. From these circuit, two series of pulses $S_4$ and $S_5$ are obtained having shifted phase from the pulse signal $S_3$. This pulse signal $S_5$ is used as a reset signal for two counters 16 and 17 and the pulse signal $S_4$ is used as a latch signal for two latch circuits 18 and 19.

The counter 16 counts clock pulses $S_6$ derived from a clock oscillator 15 and it is reset at each time of the supply of the pulse signals $S_5$. The latch circuit 18 reads out the counter 16 at each time of the supply of the pulse signal $S_4$ and it holds the read out count until a moment that a next pulse signal $S_4$ is given and delivers the count at that occasion. Since the pulse signal $S_4$ is sent out just prior to the pulse signal $S_5$, as has been explained in the foregoing, the output signal of the latch circuit 18 becomes equal to the number of clock pulses delivered to the output during one period of the output signal $S_1$ of the Karman vortex sensor 2. Namely this signal has a value in proportion to the period Tk of the signal $S_1$.

The relation between the period TK of the output signal $S_1$ of the Karman vortex sensor 2 and the volumetric flow rate Qv is given by the following.

$$Qv \propto 1/Tk$$

When we assume the count number of the clock pulse $S_6$ counted during the abovementioned one period as W, the following relation exists.

$$W = \frac{Tk}{Tc} \propto \frac{1}{TcQv}$$

(wherein; Tc is a duration of the clock pulse $S_6$). Accordingly, the reciprocal number of W is in proportion to the volumetric flow rate Qv.

Further there is provided a NOR gate 20, and AND gates 21 and 22, which constitute a circuit to determine a count of a certain number (namely a certain flow rate). In the example shown in FIG. 1, AND gate 22 will supply the value "1" signal as output signal $S_7$ in response to the binary number of 00010110 corresponding to decimal 104. The particular number stored counter 16 to which the output signal $S_7$ is responsive (and this number corresponds to a standard flow value to produce stable Karman vortices) depends upon the type of gates and gate connections provided at the output of latch 18.

When the output signal of the latch circuit 18 assumes a value corresponding to the aforementioned standard flow rate, the output $S_7$ of the AND gate 22 assumes a value "1". This means that when the volumetric flow rate detected by the Karman vortex sensor 2 corresponds to a value lying in a standard flow rate range to produce the Karman vortex stably and to produce a sufficiently large differential pressure, the output $S_7$ of the AND gate 22 becomes value "1" and it becomes as "0" in the other occasion.

A sample-and-hold circuit 24 is connected at the output of the AND gate 22 and it reads in the output of a differential pressure detecting circuit 23 when the output $S_7$ of the AND gate 22 varies from "0" to "1" and holds the value until the output signal $S_7$ varies again to a value "1" next and delivers the value to the output. Accordingly, the output of the sample-and-hold circuit 24 assumes a value in proportion to $\Delta P = \rho Q^2 v$. Wherein, as has been mentioned in the foregoing, the sample-and-hold circuit 24 takes the sample only at the time that the volume flow rate Qv lies in a certain standard flow rate range. In practice the value Qv is regarded as a constant value so that the value of $\Delta P$ assumes a value in proportion to the density $\rho$ of the air at that time. Namely the output voltage of the sample-and-hold circuit 24 assumes a value in proportion to the density $\rho$.

A voltage controlled oscillator 25 is provided to receive the output of the sample-and-hold circuit 24 and delivers a pulse signal $S_8$ having a period in proportion to the output voltage of the sample-and-hold circuit 24. Namely, if we assume the period of the pulse signal $S_8$ as T'c, it is expressed by: $T'c = K_1 \rho$ (wherein, $K_1$ is a constant).

The counter 17 counts the pulse signal $S_8$ and is reset by the signal $S_5$. The latch circuit 19 reads out the count number of the counter 17 at each time it is given by the pulse signal $S_4$ and holds this value until next pulse signal $S_4$ is given and delivers this value then. Accordingly, the output signal of the latch circuit 19 has a value corresponding to the number of the output pulse signal $S_8$ sent out during one period of the Karman vortex sensor 2. If we assume this value as W', the following exists:

$$W' = Tk/Tc$$

Whereas there exists the relations of:

$$Tk = K_2/Qv \quad (1)$$

$$Tc = K_1 \rho \quad (2)$$

(wherein; $K_1$ and $K_2$ are constants). It is derived the followings.

$$W' = (K_2/Qv)\cdot(1/K_1 P)$$

and $$1/W' = K\rho Qv = KQw$$

(wherein; $K = K_1/K_2$.

From this it can be observed that the reciprocal number of the count W' is in proportion to the mass flow rate Qw.

By the above reason it is possible to detect the mass flow rate Qw by obtaining at first the reciprocal of the output of the lach circuit 19.

FIG. 1 shows a circuit based on digital principle, however, Qw can be obtained likewisely by an analog system.

For obtaining the differential pressure, a dynamic detector such as a Venturi tube, an orifice or a Pitot tube, or the like may be provided in the intake tube 1 and the dynamic pressure $\rho Q^2 v$ may be obtained.

As has been explained in the foregoing, according to the present invention, the measurement for the mass of the air is effected only in a range where the production of the Karman vortex is stable and the dynamic pressure has sufficiently large value. The obtained value of the mass is used for the calibration of the density of the air so that a highly accurate mass flow rate can be obtained. The amount of the intake air of an internal engine for an automative vehicle varies frequently and over a wide range according to the driving condition so that there will be considerably many chances of assuming the standard flow rate range. Therefore, the system of the present invention is suffice to compensate the influence of the variation of the density $\rho$ caused by the altitude, the atmospheric pressure and the temperature.

In general the density of the air may be calculated by operation by using the measured values of the temperature and the atmospheric pressure. However, according to the present invention, it is sufficient by measuring the dynamic pressure or the differential pressure only so that the mass flow rate may very easily be detected by combining with a Karman vortex sensor. The dynamic range of the sensor for detecting the dynamic pressure or the differential pressure can be made very narrow at a point of the standard flow rate so that the measurement of the dynamic pressure may be effected very accurately and easily.

What is claimed is:

1. An intake air flow rate detector of an internal engine using a Karman vortex sensor provided in an intake system of the engine for measuring the amount of the intake air comprising:

first means for delivering a first signal each time an output of the Karman vortex sensor assumes a predetermined period or is within a predetermined frequency range, second means for detecting a dynamic pressure of the intake air or a differential pressure between two points in said intake system;

third means for sampling and holding an output of said second means at each time of delivery of the first signal, and fourth means responsive to outputs of said Karman vortex sensor and said third means for delivering an output signal which has a value corresponding to the output of the Karman vortex sensor after density compensation.

2. An intake air flow rate sensor as claimed in claim 1, wherein said second means comprises a closed chamber divided by two parts by a diaphragm, pipes for delivering pressure to each of said parts of the closed chamber each connected from the intake system at upstream and downstreamof the Karman vortex sensor respectively, and a strain gage for detecting strain of said diaphragm.

3. An intake air flow rate sensor as claimed in claim 1, wherein said fourth means comprises first circuit for delivering an output pulse signal having a pulse duration in proportion to the output of said third means, and a second circuit for delivering output by counting a number of pulses of said pulse signal during each period of the signal of the Karman vortex sensor.

* * * * *